United States Patent
Tsujimoto (10) Patent No.: US 7,972,170 B2
(45) Date of Patent: Jul. 5, 2011

(54) CARD CONNECTOR (75) Inventor: Masaki Tsujimoto, Yokohama (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 99 days.

(21) Appl. No.: 12/620,899

(22) Filed: Nov. 18, 2009

(65) Prior Publication Data

US 2010/0128429 A1 May 27, 2010

(30) Foreign Application Priority Data

Nov. 21, 2008 (JP) ................................ 2008-297845

(51) Int. Cl.
*H01R 13/66* (2006.01)
(52) U.S. Cl. ................................ 439/541.5; 439/607.31
(58) Field of Classification Search ............... 439/541.5, 439/64, 607.31
See application file for complete search history.

(56) References Cited

U.S. PATENT DOCUMENTS

| | | | | |
|---|---|---|---|---|
| 7,540,778 | B2 * | 6/2009 | Cheng | 439/607.22 |
| 2002/0025720 | A1 * | 2/2002 | Bright et al. | 439/607 |
| 2008/0280487 | A1 * | 11/2008 | Ting | 439/541.5 |

FOREIGN PATENT DOCUMENTS

| | | |
|---|---|---|
| JP | 06-283231 A | 10/1994 |
| JP | 07-302645 A | 11/1995 |
| JP | 11-214075 A | 8/1999 |
| JP | 2000-123919 A | 4/2000 |
| JP | 2000-294318 A | 10/2000 |
| JP | 2003-323943 A | 11/2003 |
| JP | 2004-030078 A | 1/2004 |

* cited by examiner

*Primary Examiner* — Hien Vu
(74) *Attorney, Agent, or Firm* — Rader, Fishman & Grauer PLLC (57) ABSTRACT

The present invention provides a card connector that can be loaded on a double-sided printed circuit board and allows intergration of components using common components. A first and a second housing 1, 2 have a pair of cranked hook-shaped projections 17. A first and a second covering plate 5, 6 have a cranked hook-shaped opening 57. The first covering plate 5 can be joined to the second housing 2 by reversing in a left-right direction the first covering plate 5. The second covering plate 6 can be joined to the first housing 1 by reversing in a left-right direction the second covering plate 6. The first and the second housings 1, 2, and the first and the second covering plates 5, 6 can be used as common parts, respectively.

7 Claims, 9 Drawing Sheets

CARD CONNECTOR

The present application claims the benefit of priority based on Japanese Patent Application No. 2008-297845, filed on Nov. 21, 2008, disclosure of which is incorporated herein in its entirety by reference.

BACKGROUND OF THE INVENTION

1. Field of the Invention

The present invention relates to a card connector. Particularly, the present invention relates to a structure of a card connector that can be mounted on both surfaces of a printed circuit board.

2. Related Art

In recent years, a memory card driving device having a two-tier driving device, to which memory cards can be loaded above and below each other, has been developed for practical use. In addition, a memory card driving device is disclosed in which an upper and a lower driving device are assembled together using an assembly leg, while a two-tier memory card driving device is loaded on a printed circuit board (for example, Japanese Unexamined Patent Application Publication No. H7-302645, hereinafter referred to as Patent Document 1).

In the two-tier memory card driving device, in a case where a card connector, in which cards and ejection buttons are oriented in the same direction and which can be loaded on both surfaces of a printed circuit board, is to be realized, it has been difficult to make a common housing due to a coupled structure of a housing and a cover.

In a card connector, in which cards and ejection buttons are oriented in the same direction and which can be loaded on both surfaces of a printed circuit board, if a coupled structure of housing and cover can be constructed such that the housing and the cover are common components, components having different shapes can be reduced, thereby contributing to a reduction of production cost. The above is a problem to be solved by the present invention.

SUMMARY OF THE INVENTION

The present invention is made in view of the abovementioned problem and aims at providing a card connector that can be loaded on both surfaces of a printed circuit board and allows integration of components using common components.

The present inventor found that the abovementioned problem can be solved by an invention of respective forms of a projection (detent) provided on both lateral surfaces of a housing and of an opening (indent) provided on both lateral surfaces of a cover in a coupled structure of the housing and the cover, thus leading to realization of the invention of a novel card connector as described hereinafter.

In a first aspect of the present invention, a card connector includes a first connector having a first slot that is implemented in an end portion of a first surface of a printed circuit board, and into which a card can be inserted; and a second connector having a second slot that is implemented in an end portion of a second surface of the printed circuit board, and into which a card can be inserted; in which: the first slot and the second slot are disposed such that the first and the second slots face to each other correspondingly across the printed circuit board; the first connector includes a flat first housing for housing a card, a first contacts group that is disposed in a base end portion of the first housing and connected to a terminal provided on a card, and a first covering plate that covers a first surface and both lateral faces of the first housing; the second connector includes a flat second housing for housing a card, a second contacts group that is disposed in a base end portion of the second housing and connected to a terminal provided on a card, and a second covering plate that covers a second surface and both lateral faces of the second housing; the first housing and the second housing, the first contacts group and the second contacts group, and the first covering plate and the second covering plate are formed from the same component or the same group of components; the first housing and the second housing include a pair of first projections projecting from both lateral faces thereof, the pair of first projections has a first tilted surface tilted toward a first direction on one end portion thereof and a first step facing in a second direction on another end portion thereof and a pair of second projections projecting from both lateral faces thereof, the pair of second projections being provided with a second step facing in a first direction on one end portion thereof so as to be behind the first tilted surface, and a second tilted surface tilted toward a second direction on another end portion thereof so as to be in front of the first step; and the first covering plate and the second covering plate include a pair of first openings opening to both lateral walls thereof, the pair of first openings has an engaging side that engages with the first step or the second step, and a clearance portion that avoids the first tilted surface when the first step engages with the engaging side and avoids the second tilted surface when the second step engages with the engaging side and a pair of second openings opening to both lateral walls thereof, the pair of second openings avoiding the second projection when the first opening engages with the first step and avoiding the first projection when the first opening engages with the second step.

The card connector according to a first aspect of the invention includes a first connector and a second connector. The first connector has a first slot that is implemented in an end portion of a first surface of a printed circuit board, and into which a card can be inserted. The second connector has a second slot that is implemented in an end portion of a second surface of the printed circuit board, and into which a card can be inserted. The first slot and the second slot are disposed such that the first and the second slots face to each other correspondingly across the printed circuit board.

The first connector includes a flat first housing, a first contacts group, and a first covering plate. The first housing can house a card. The first contacts group is disposed in a base end portion of the first housing and connected to a terminal provided on a card. The first covering plate covers a first surface and both lateral surfaces of the first housing.

The second connector includes a flat second housing, a second contacts group, and a second covering plate. The second housing can house a card. The second contacts group is disposed in a base end portion of the second housing and connected to a terminal provided on a card. The second covering plate covers a first surface and both lateral surfaces of the second housing.

In addition, the first housing and the second housing, the first contacts group and the second contacts group, and the first covering plate and the second covering plate are formed from the same component or the same group of components.

The first housing and the second housing have a pair of first projections and a pair of second projections that project from both lateral surfaces thereof.

The first projection is provided with a first tilted surface tilted toward a first direction on a first end portion thereof and a first step facing in a second direction on a second end portion thereof. The second projection is provided with a second step facing in a first direction on a first end portion thereof so as to be behind the first tilted surface (toward the inner side of the second protrusion, that is, on a printed circuit board side). The second projection is provided also with a second tilted surface tilted toward a second direction on a second end portion thereof so as to be in front of the first step (toward the outer side of the second protrusion, that is, on a printed circuit board side).

The first covering plate and the second covering plate have a pair of first openings and a pair of second openings that open to both lateral walls thereof.

The first opening has an engaging side that engages with the first step or the second step and a clearance portion that avoids the first tilted surface (opens not to interfere with the first tilted surface) when the first step engages with the engaging side and avoids the second tilted surface when the second step engages with the engaging side.

The second opening avoids the second projection (opens not to interfere with the second projection) when the first opening engages with the first step and avoids the first projection (opens not to interfere with the first projection) when the first opening engages with the second step.

Here, the first housing and the second housing have electrical insulating properties. An insulating housing can be a housing made of a nonconductive material. An insulating housing of a desired shape can be obtained by casting synthetic resin.

For example, the first housing and the second housing can have a pair of arms that extend substantially horizontally from a base end portion to an apex portion, and a connecting portion that connects the base end portions of the pair of arms. The pair of arms can be provided with grooves facing each other that run from the apex portion thereof to the base end portion thereof. The grooves guide both lateral walls of a card, thereby housing the card in the first housing or the second housing.

The first contacts group and the second contacts group can be fixed on a base end portion of the first housing or of the second housing by press fit or molding (casting). In addition, in the first contacts group and the second contacts group, a first end of a contact can contact a terminal (electrical terminal) of a card and a second end of the contact is preferably solder-mounted on a printed circuit board. The second end of the contact can be mounted on the printed circuit board by a solderless connection.

The contact can be a pin contact, a socket contact, or a plate contact having a spring property such as a cantilever contact. An appropriate contact is selected according to type of terminal provided on the card.

The first covering plate and the second covering plate are composed of, for example, sheet metal. A covering plate of a desired shape can be obtained by subjecting the laid out sheet metal to metal forming process. The covering plate is preferably made of conductive sheet metal so that a shielding effect can be obtained by covering a housing by a flat surface of the covering plate.

The first covering plate and the second covering plate can be flexed to a right angle at both side ends to form both the lateral walls, on which a first opening is formed that can engage with the first projection or the second projection that project from both lateral surfaces of the housing. Here, the first opening corresponds to an insertion direction of the first covering plate or the second covering plate. In addition, a second opening can be formed on both lateral walls, avoiding the first projection or the second projection.

The first slot can be configured by attaching the first covering plate to the first housing, and the second slot can be configured by attaching the second covering plate to the second housing. The first slot and the second slot can be mounted on the top and bottom of the printed circuit board, or on the left and right of the printed circuit board.

By moving the first covering plate in a first direction of the first housing, an end edge of both lateral walls of the first covering plate is pushed open by the first tilted surface and the second tilted surface. By further moving the first covering plate, the pair of engaging sides can engage with the first step and the second step. In this state, since the pair of second openings avoids the first projection or the second projection, both the lateral walls of the first covering plate can return to an initial state.

On the other hand, by moving the second covering plate in a second direction of the second housing, an end edge of both lateral walls of the second covering plate is pushed open by the first tilted surface and the second tilted surface. By further moving the second covering plate, the pair of second sides can engage with the first step and the second step. In this state, since the pair of first openings avoids the first projection or the second projection, both the lateral walls of the second covering plate can return to an initial state.

As described above, the card connector according to the first aspect of the invention is a card connector that can be mounted on both surfaces of the printed circuit board, in which the first and the second housings, the first and the second contacts groups, and the first and the second covering plates are formed from the same component or the same group of components.

In the card connector according to the first aspect of the invention, the first covering plate can be joined to the second housing by being reversed in a left-right direction. In addition, the second covering plate can be joined to the first housing by being reversed in a left-right direction. The first and the second housings, and the first and the second covering plates can be used as common parts respectively. In other words, a coupled structure of housing and cover can be constructed such that the housing and the cover are common components.

According to a second aspect of the present invention, it is preferable that the first projection and the second projection are adjacent to each other and communicate with the first opening and the second opening.

In the card connector according to a second aspect of the invention, the first projection and the second projection can be adjacent to and integrated with each other in a form of a cranked hook and the first opening and the second opening communicate with each other and are integrally opened in a form of a cranked hook.

In a third aspect of the present invention, a card connector includes a first connector having a first slot that is implemented in an end portion of a first surface of a printed circuit board, and into which a card can be inserted; and a second connector having a second slot that is implemented in an end portion of a second surface of the printed circuit board, and into which a card can be inserted; in which: the first slot and the second slot are disposed such that the first and the second slots face to each other correspondingly across the printed circuit board; the first connector includes a flat first housing for housing a card, a first contacts group that is disposed in a base end portion of the first housing and connected to a terminal provided on a card, and a first covering plate that covers a first surface and both lateral faces of the first housing; the second connector includes a flat second housing for housing a card, a second contacts group that is disposed in a base end portion of the second housing and connected to a terminal provided on a card, and a second covering plate that covers a second surface and both lateral faces of the second housing; the first housing and the second housing, the first contacts group and the second contacts group, and the first covering plate and the second covering plate are formed from the same component or the same group of components; the first housing and the second housing include a pair of H-shaped third projections projecting from both lateral faces thereof, the pair of H-shaped third projections being provided with a pair of third steps oriented in opposite directions in a central portion thereof, and a pair of third tilted surfaces oriented in opposite directions on both sides of the third steps so as to be in front of the third steps; and the first covering plate and the second covering plate include a pair of H-shaped third openings opening to both lateral walls thereof, the pair of H-shaped third openings being provided with an engaging tooth in a central portion thereof that engages with any one of the third steps of the third projections, and a pair of concave portions avoiding the pair of third tilted surfaces of the third projections on both sides of the engaging tooth.

The card connector according to a third aspect of the invention includes a first connector and a second connector. The first connector has a first slot that is implemented in an end portion of a first surface of a printed circuit board, into which a card can be inserted. The second connector has a second slot that is implemented in an end portion of a second surface of the printed circuit board, into which a card can be inserted. The first slot and the second slot are disposed such that the first and the second slots face to each other correspondingly across the printed circuit board.

The first connector includes a flat first housing, a first contacts group, and a first covering plate. The first housing can house a card. The first contacts group is disposed in a base end portion of the first housing and is connected to a terminal provided on a card. The first covering plate covers a first surface and both lateral surfaces of the first housing.

The second connector includes a flat second housing, a second contacts group, and a second covering plate. The second housing can house a card. The second contacts group is disposed in a base end portion of the second housing and connected to a terminal provided on a card. The second covering plate covers a second surface and both lateral surfaces of the second housing.

In addition, the first housing and the second housing, the first contacts group and the second contacts group, and the first covering plate and the second covering plate are formed from the same component or the same group of components.

The first housing and the second housing have a pair of H-shaped third projections that project from both lateral surfaces. The third projections are provided with a pair of third steps oriented in opposite directions in a central portion thereof and a pair of third tilted surfaces oriented in opposite directions on both sides of the third steps so as to be in front of the third steps.

The first covering plate and the second covering plate have a pair of H-shaped third openings, opening to both lateral walls thereof. The third openings are provided with an engaging tooth in a central portion thereof, that engages with any one of the third steps of the third projections. In addition, the third openings are provided with a pair of concave portions, which avoid the pair of third tilted surfaces of the third projections on both sides of the engaging tooth.

The first covering plate and the second covering plate can be flexed to a right angle at both side ends to form both the lateral walls, on which a third opening is formed that can engage with the third projection that projects from both lateral surfaces of the housing. Here, the engaging tooth of the third opening corresponds to an insertion direction of the first covering plate or the second covering plate.

The first slot can be configured by attaching the first covering plate to the first housing, and the second slot can be configured by attaching the second covering plate to the second housing. The first slot and the second slot can be mounted on the top and bottom of the printed circuit board, or on the left and right of the printed circuit board.

By moving the first covering plate in a first direction of the first housing, an end edge of both lateral walls of the first covering plate is pushed open by the one pair of third tilted surfaces. By further moving the first covering plate, the pair of engaging teeth can engage with the pair of third steps. In this state, since the pair of concave portions avoids the pair of third projections (opens not to interfere with the third projection), both the lateral walls of the first covering plate can return to an initial state.

On the other hand, by moving the second covering plate in a second direction of the second housing, an end edge of both lateral walls of the second covering plate is pushed open by another pair of third tilted surfaces. By further moving the second covering plate, the pair of engaging teeth can engage with the pair of third steps. In this state, since the pair of concave portions avoids the pair of third projections, both the lateral walls of the second covering plate can return to an initial state.

As described above, the card connector according to the third aspect of the invention is a card connector that can be mounted on both surfaces of the printed circuit board, in which the first and the second housings, the first and the second contacts groups, and the first and the second covering plates are formed from the same component or the same group of components.

In the card connector according to the third aspect of the invention, the first covering plate can be joined to the second housing by being reversed in a left-right direction. In addition, the second covering plate can be joined to the first housing by being reversed in a left-right direction. The first and the second housings, and the first and the second covering plates can be used as common parts respectively. In other words, a coupled structure of housing and cover can be constructed such that the housing and the cover are common components.

According to a fourth aspect of the present invention, it is preferable that the first connector includes a first ejection mechanism that is connected with the first covering plate and can eject a card; the second connector includes a second ejection mechanism that is connected with the second covering plate and can eject a card; and the first ejection mechanism and the second ejection mechanism are formed from the same group of components.

In the card connector according to the fourth aspect of the invention, a first connector includes a first ejection mechanism. The first ejection mechanism is connected with the first covering plate and can eject a card. In addition, in the card connector according to the fourth aspect of the invention, a second connector includes a second ejection mechanism. The second ejection mechanism is connected with the second covering plate and can eject a card. Furthermore, the first ejection mechanism and the second ejection mechanism are formed from the same group of components.

The first ejection mechanism and the second ejection mechanism preferably use a leverage linkage mechanism in which a card is ejected by pressing ejection buttons adjacent to the first slot and the second slot respectively. The first ejection mechanism and the second ejection mechanism are preferably attached to a lateral wall of the first covering plate or the second covering plate. Here, the first ejection mechanism and the second ejection mechanism can operate independently from each other.

In the card connector according to the fourth aspect of the invention, ejection buttons can be oriented in the same direction in a card connector that can be mounted on both surfaces of a printed circuit board.

According to a fifth aspect of the present invention, it is preferable that the first covering plate and the second covering plate include a plurality of lead terminals, solder-mounted on the printed circuit board, on both lateral walls thereof.

In the card connector according to the fifth aspect of the invention, a pair of card connectors can be mounted on both surfaces of a printed circuit board by solder-mounting a plurality of lead terminals on the printed circuit board.

The card connector according to the present invention is a card connector that can be mounted on both surfaces of the printed circuit board, in which the first and the second housings, the first and the second contacts groups, and the first and the second covering plates are formed from the same component or the same group of components.

The card connector according to the present invention can realize a card connector having common components, in a coupled structure of the housing and the cover, by having the shape of a projection (detent) provided on both lateral surfaces of a housing and of an opening (indent) provided on both lateral surfaces of a cover, as a cranked hook shape or an H-shape.

DETAILED DESCRIPTION OF THE INVENTION

A preferred mode for carrying out the present invention is described hereinafter with reference to drawings.

Figure 1:
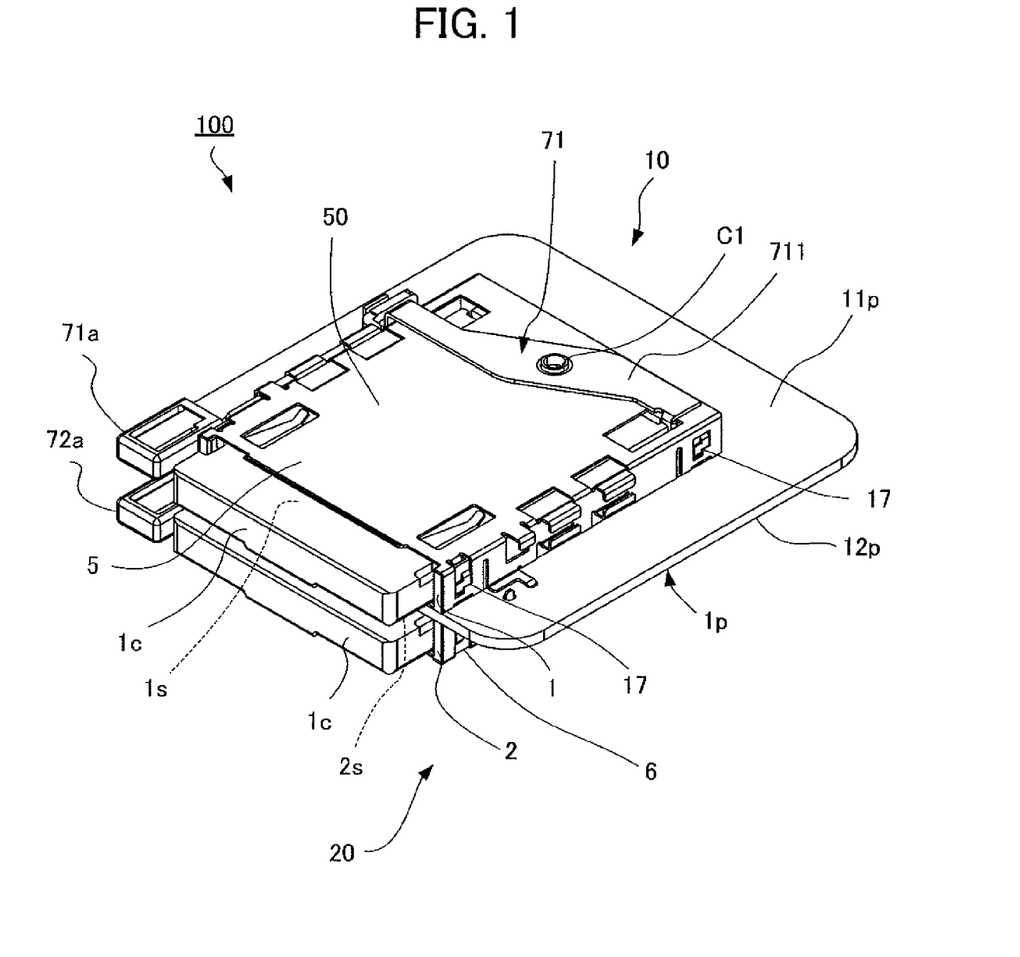
FIG. 1 is a perspective view illustrating a first embodiment of a card connector according to the present invention, in which a card is inserted.
Figure 2:
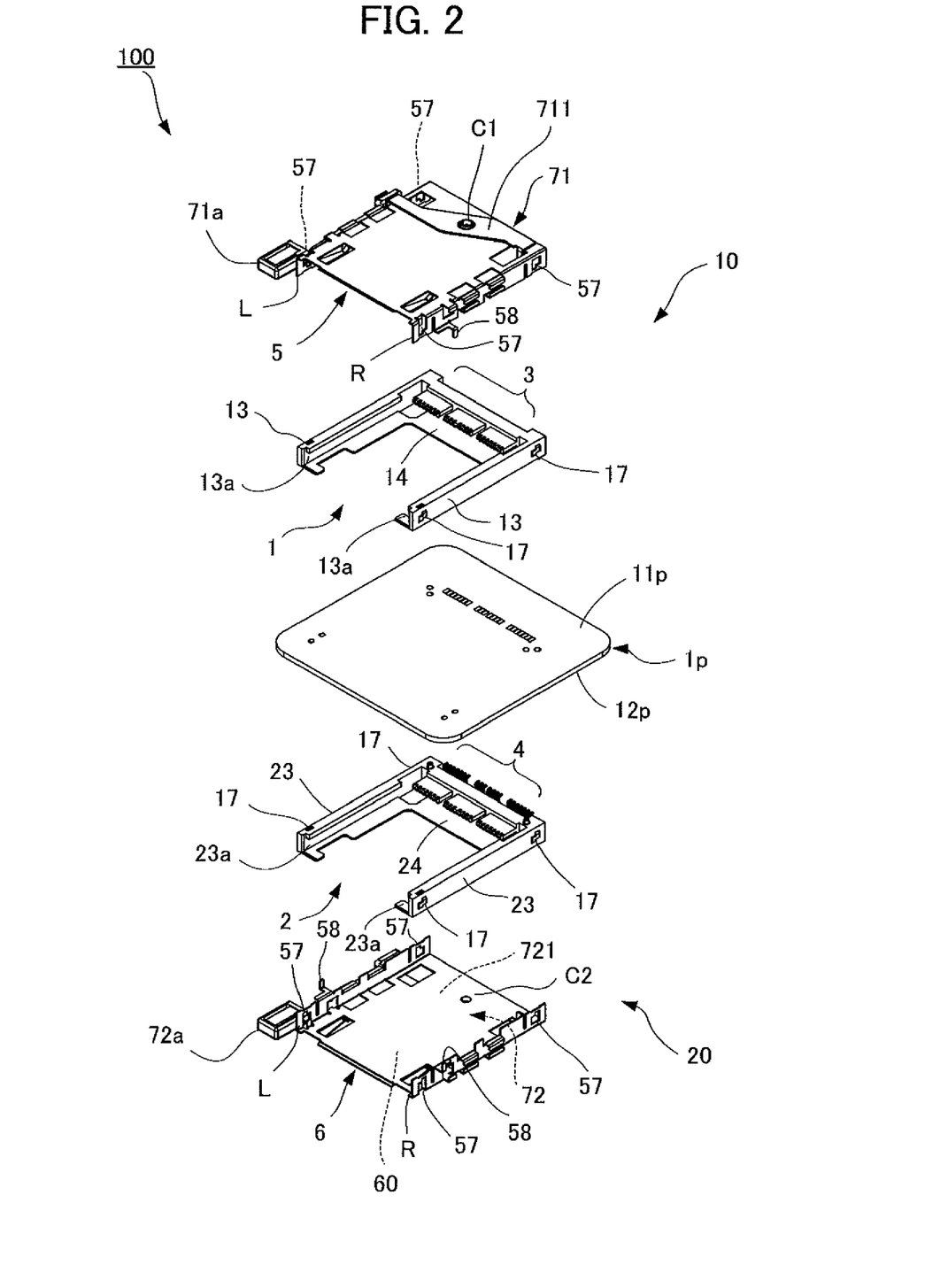
FIG. 2 is a perspective exploded assembly view of the card connector according to the first embodiment.

FIG. 1 is a perspective view illustrating a first embodiment of a card connector (hereinafter abbreviated as a connector) according to the present invention, in which a card is inserted. FIG. 2 is a perspective exploded assembly view of the connector according to the first embodiment.

Figure 3:
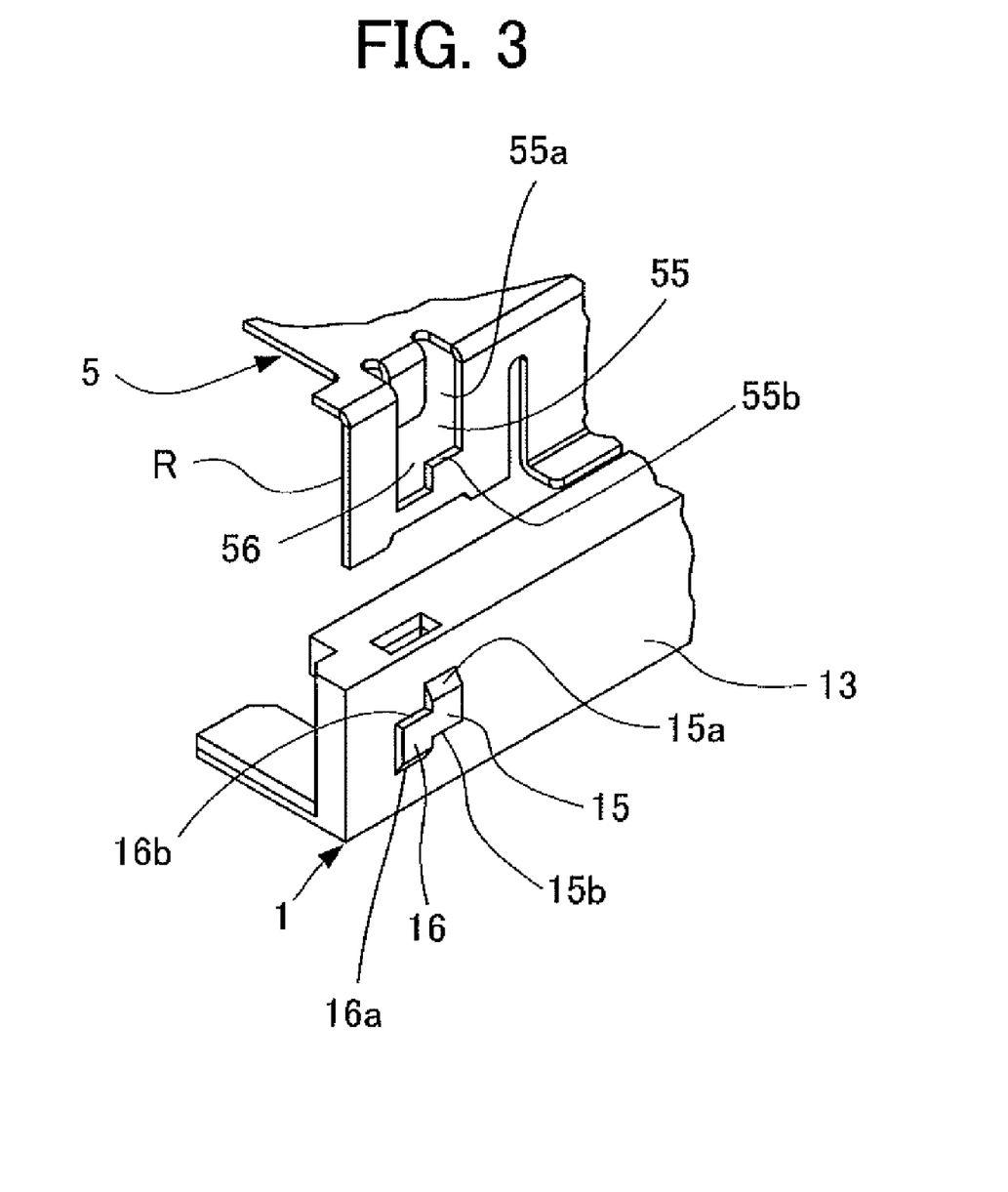
FIG. 3 is a perspective exploded assembly view enlarging a substantial part of a first connector in the card connector according to the first embodiment.
Figure 4A:
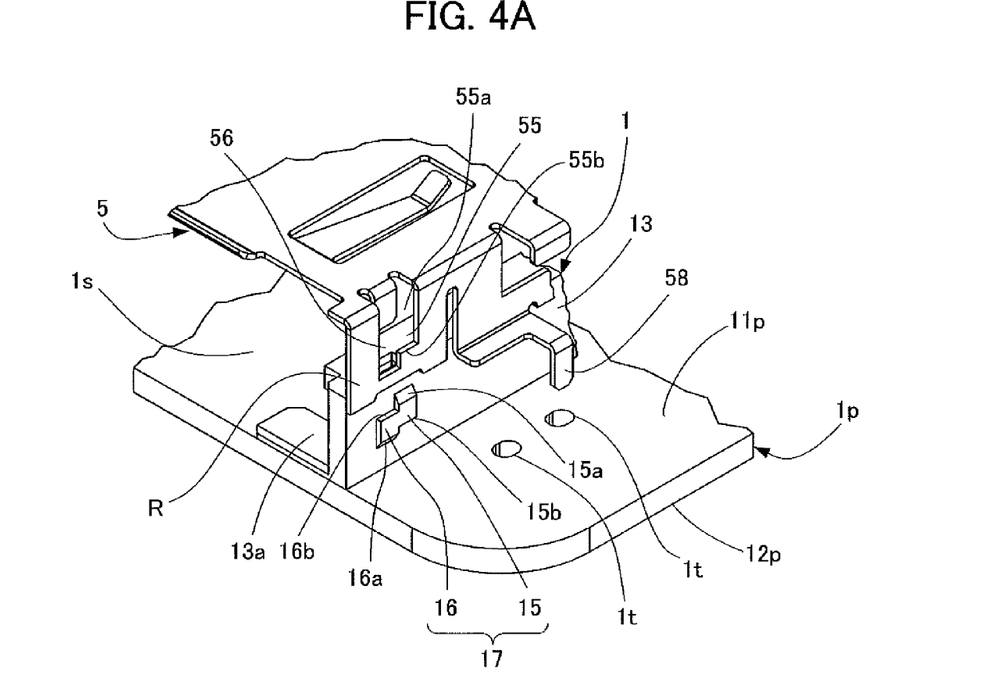
FIG. 4A is a perspective exploded assembly view enlarging a substantial part of the first connector according to the first embodiment.
Figure 4B:
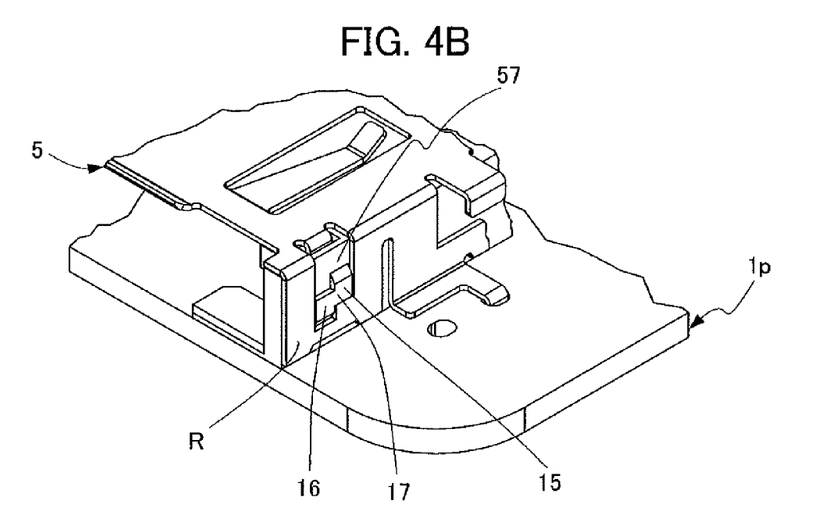
FIG. 4B is a perspective exploded assembly view enlarging a substantial part of the first connector according to the first embodiment.

FIG. 3 is a perspective exploded assembly view enlarging a substantial part of a first connector in the connector according to the first embodiment. FIGS. 4A and 4B are perspective exploded assembly views enlarging a substantial part of the first connector according to the first embodiment: FIG. 4A is a diagram showing a state where a first covering plate is not yet attached to a first housing; and FIG. 4B is a diagram showing a state where the first covering plate is attached to the first housing.

Figure 5A:
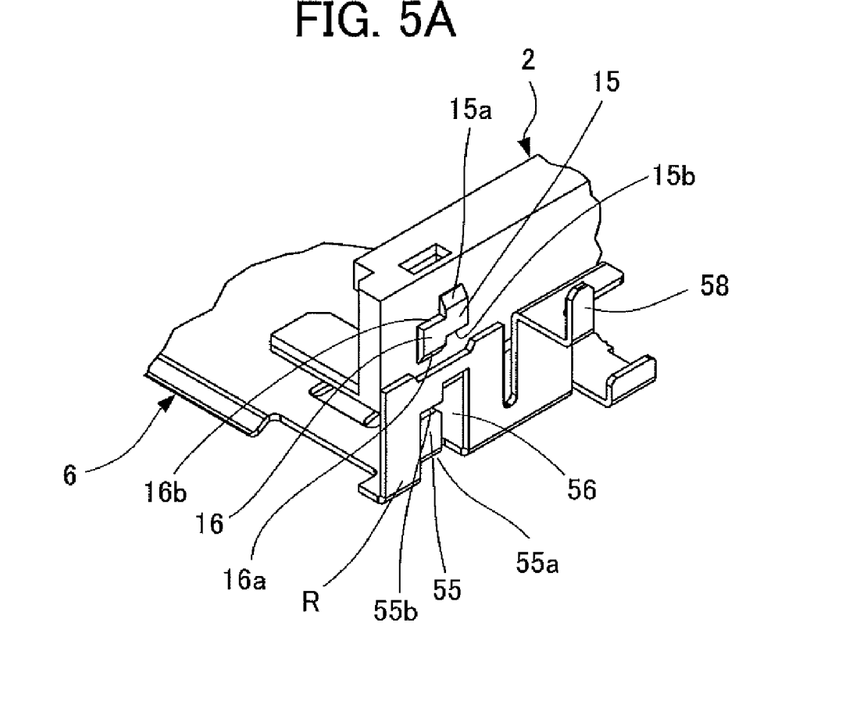
FIG. 5A is a perspective exploded assembly view enlarging a substantial part of the second connector according to the first embodiment.
Figure 5B:
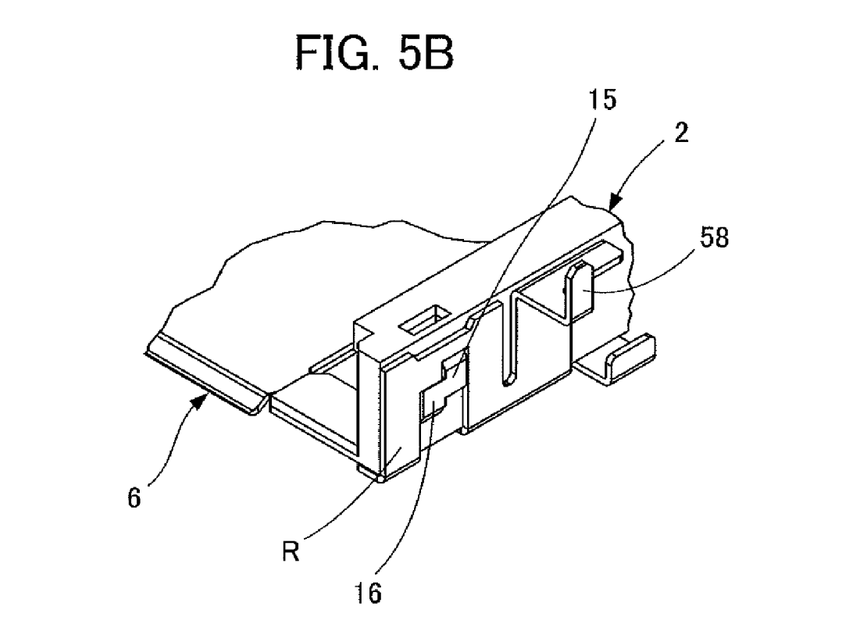
FIG. 5B is a perspective exploded assembly view enlarging a substantial part of the second connector according to the first embodiment.

FIGS. 5A and 5B are perspective exploded assembly views enlarging a substantial part of the second connector according to the first embodiment: FIG. 5A is a diagram showing a state where a second covering plate is not yet attached to a second housing; and FIG. 5B is a diagram showing a state where the second covering plate is attached to the second housing.

Figure 6:
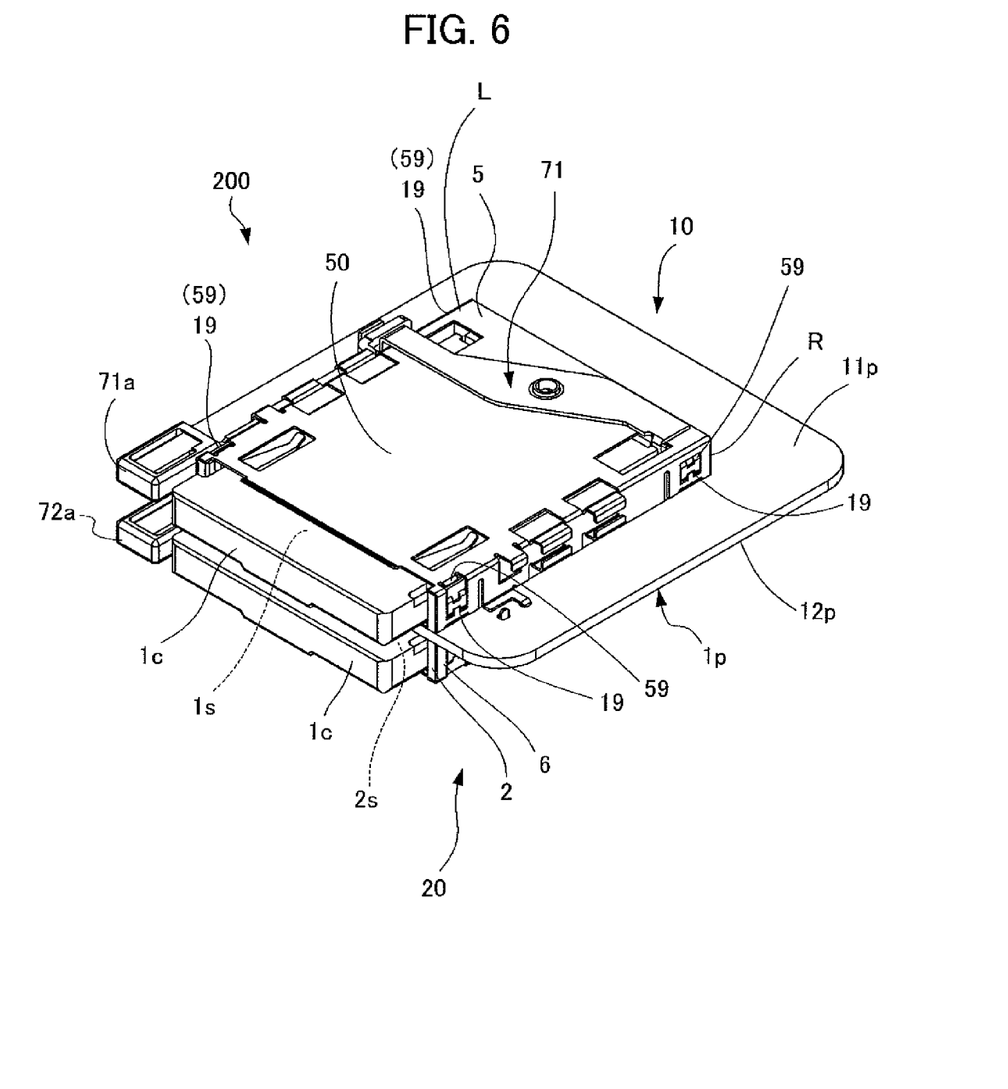
FIG. 6 is a perspective view illustrating a second embodiment of a card connector according to the present invention, in which a card is inserted.

FIG. 6 is a perspective view illustrating a second embodiment of the connector according to the present invention, in which a card is inserted.

Figure 7:
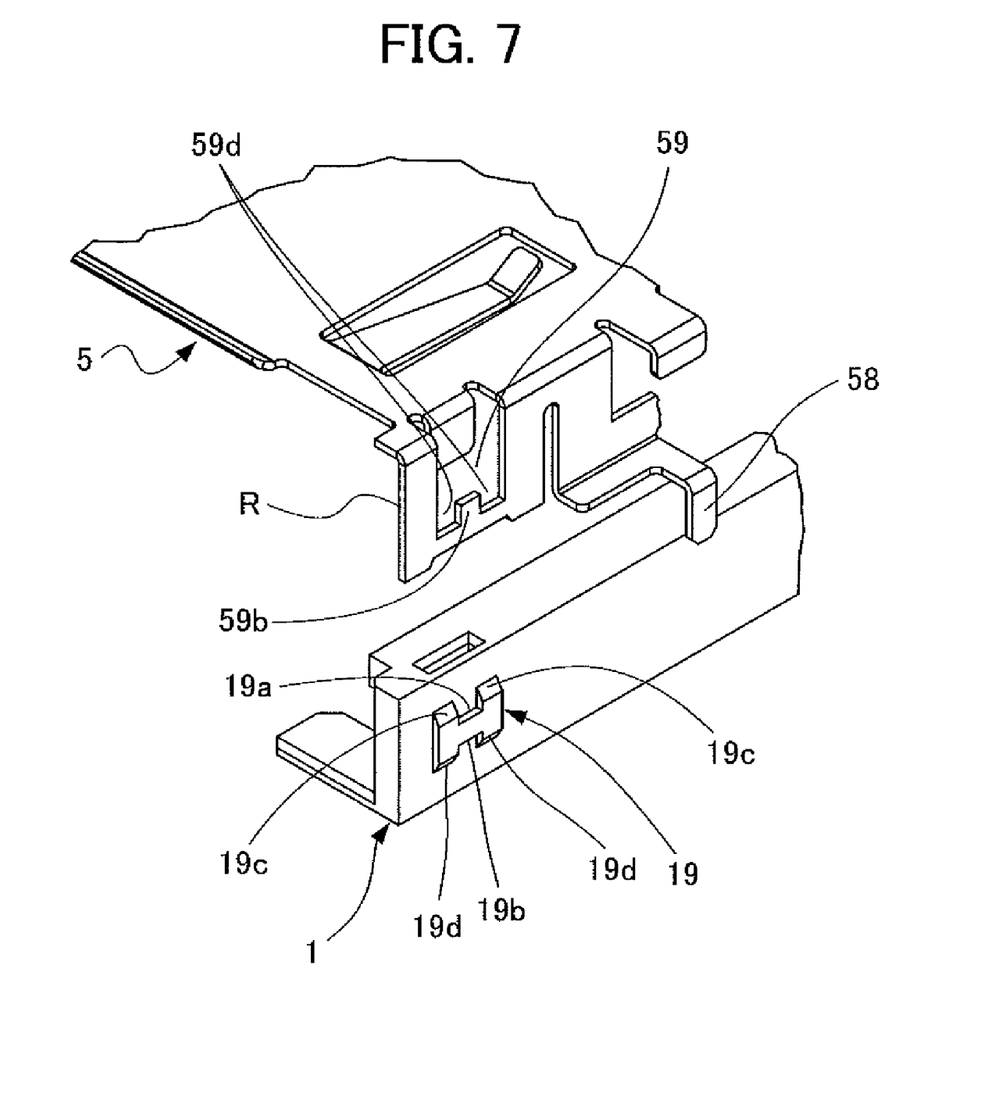
FIG. 7 is a perspective exploded assembly view enlarging a substantial part of a first connector in the card connector according to the second embodiment.
Figure 8A:
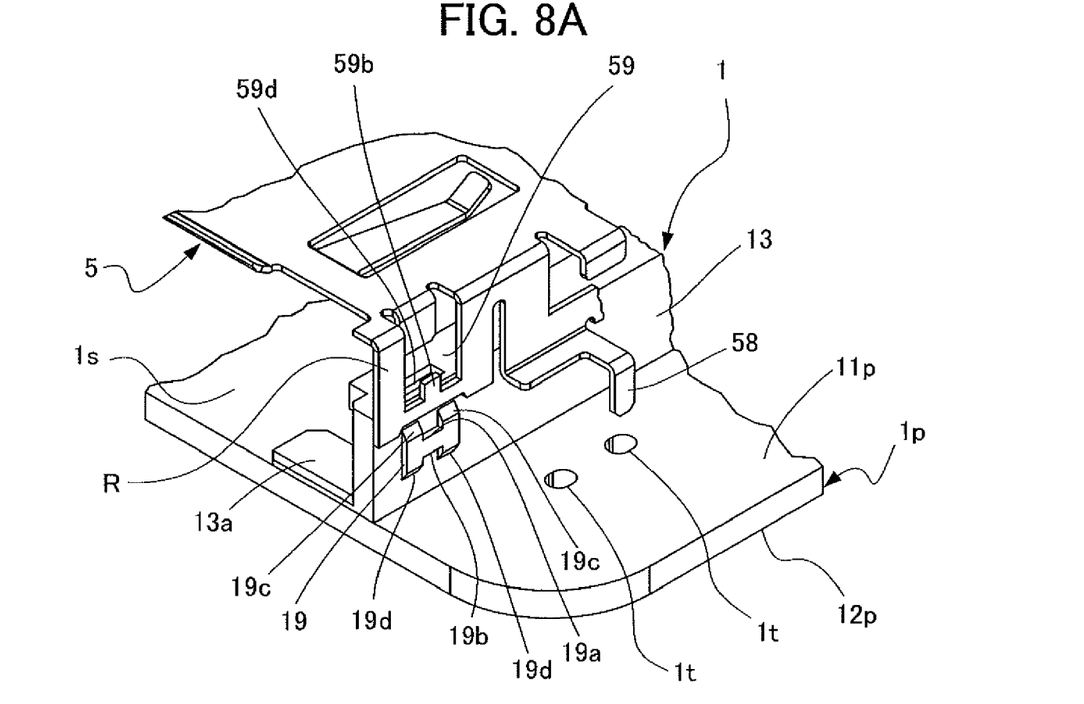
FIG. 8A is a perspective exploded assembly view enlarging a substantial part of the first connector according to the second embodiment.
Figure 8B:
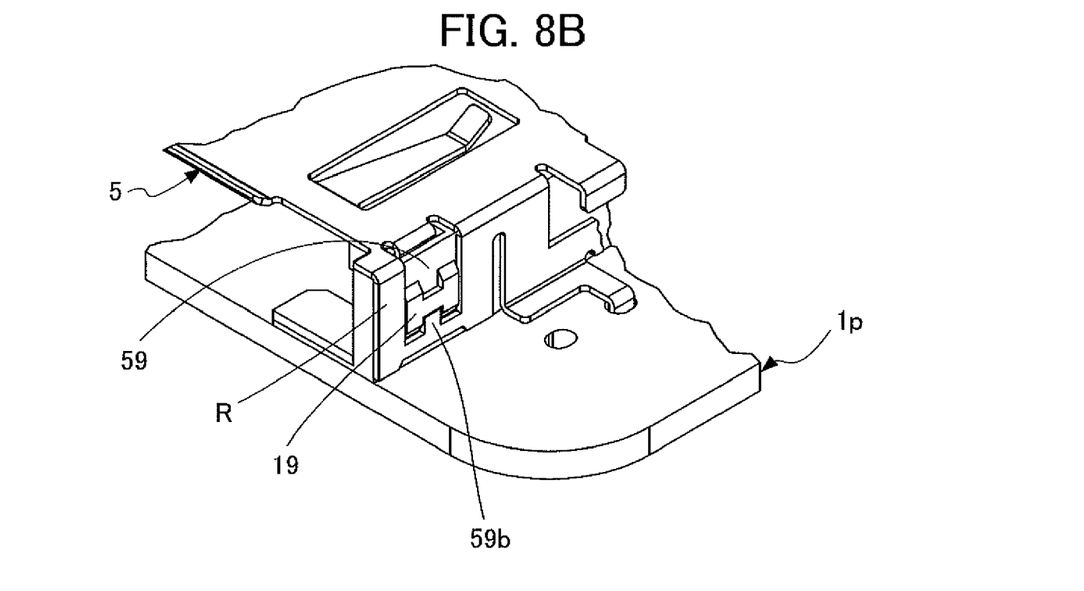
FIG. 8B is a perspective exploded assembly view enlarging a substantial part of the first connector according to the second embodiment.

FIG. 7 is a perspective exploded assembly view enlarging a substantial part of a first connector in the connector according to the second embodiment. FIGS. 8A and 8B are perspective exploded assembly views enlarging a substantial part of the first connector according to the second embodiment: FIG. 8A is a diagram showing a state where a first covering plate is not yet attached to a first housing; and FIG. 8B is a diagram showing a state where the first covering plate is attached to the first housing.

Figure 9A:
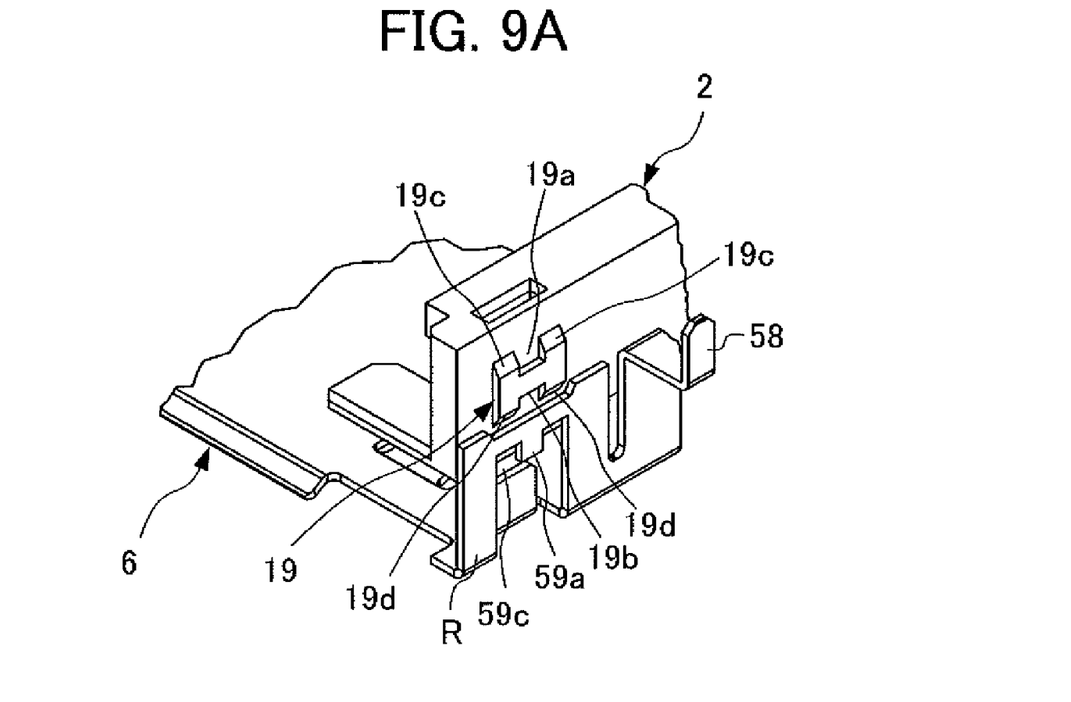
FIG. 9A is a perspective exploded assembly view enlarging a substantial part of the second connector according to the second embodiment.
Figure 9B:
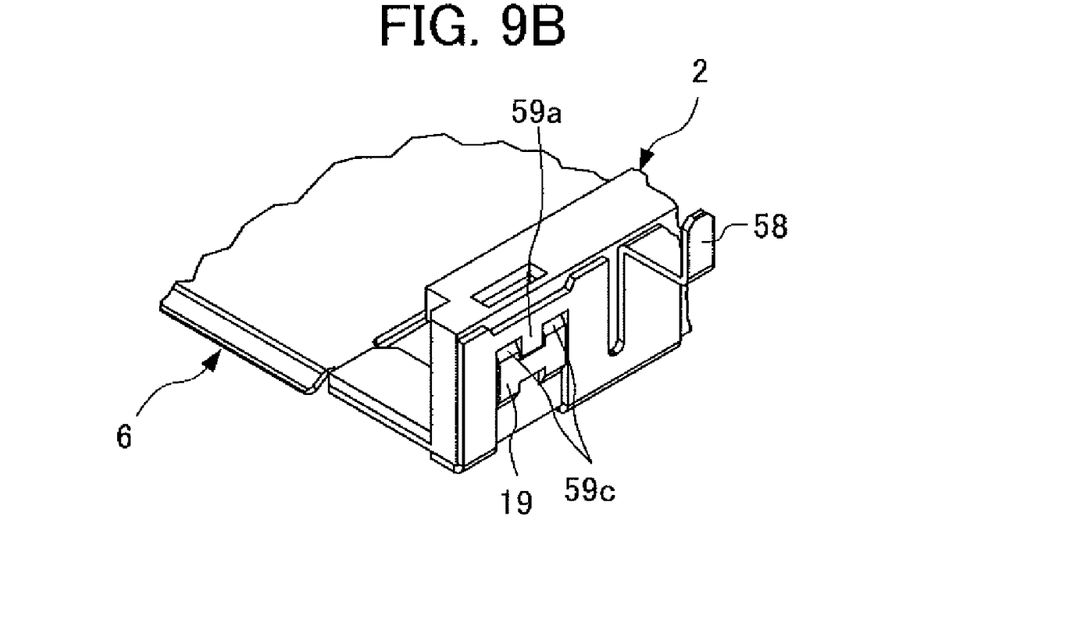
FIG. 9B is a perspective exploded assembly view enlarging a substantial part of the second connector according to the second embodiment.

FIGS. 9A and 9B are perspective exploded assembly views enlarging a substantial part of the second connector according to the second embodiment: FIG. 9A is a diagram showing a state where a second covering plate is not yet attached to a second housing; and FIG. 9B is a diagram showing a state where the second covering plate is attached to the second housing.

First, configuration of a connector according to the first embodiment of the present invention is described. According to FIG. 1 or 2, a connector 100 according to the first embodiment includes a first connector 10 and a second connector 20.

According to FIG. 1, the first connector 10 has a first slot $1s$ that is implemented in an end portion of a first surface $11p$ of a printed circuit board $1p$, into which a card $1c$ can be inserted. The second connector 20 has a second slot that is implemented in an end portion of a second surface $12p$ of the printed circuit board $1p$, into which the card $1c$ can be inserted. The first slot $1s$ and the second slot $2s$ are disposed such that the first and the second slots face to each other correspondingly across the printed circuit board $1p$.

According to FIG. 1 or 2, the first connector 10 includes a flat first housing 1, a group of first contacts 3, a first covering plate 5, and a first ejection mechanism 71. The first housing 1 can house the card $1c$. The group of first contacts 3 is disposed in a base end portion of the first housing 1 and connected to a terminal (not shown) provided on the card $1c$.

According to FIG. 1 or 2, the first covering plate 5 covers a first surface and both lateral surfaces of the first housing 1. The first ejection mechanism 71 is connected with the first covering plate 5 and can eject the card 1c.

According to FIG. 1 or 2, the second connector 20 includes a flat first housing 2, a group of second contacts 4, a second covering plate 6, and a second ejection mechanism 72. The second housing 2 can house the card 1c. The group of second contacts 4 is disposed in a base end portion of the second housing 2 and connected to a terminal (not shown) provided on the card 1c.

According to FIG. 1 or 2, the second covering plate 6 covers a first surface and both lateral surfaces of the second housing 2. The second ejection mechanism 72 is connected with the first covering plate 6 and can eject the card 1c.

In FIGS. 1 to 9, the first housing 1 and the second housing 2, the first contact 3 and the second contact 4, and the first covering plate 5 and the second covering plate 6 are formed from the same component, as described later. Furthermore, the first ejection mechanism 71 and the second ejection mechanism 72 are formed from the same group of components, as described later. Here, the components or the group of components are distinguished by assigning reference numerals for convenience of description.

According to FIG. 2, the first housing 1 has a pair of arms 13, 13 that extend substantially horizontally from a base end portion to an apex portion, and a connecting portion 14 that connects the base end portions of the pair of arms 13, 13.

According to FIGS. 1 and 2, the pair of arms 13, 13 can be provided with a pair of grooves 13a, 13a facing each other, running from the apex portion thereof to the base end portion thereof. The pair of grooves 13a, 13a guides both lateral walls of the card 1c, thereby housing the card 1c in the first housing 1.

Similarly, according to FIG. 2, the second housing 2 has a pair of arms 23, 23 that extend substantially horizontally from a base end portion to an apex portion, and a connecting portion 24 that connects the base end portions of the pair of arms 23, 23.

According to FIGS. 1 and 2, the pair of arms 23, 23 can be provided with a pair of grooves 23a, 23a facing each other, running from the apex portion thereof to the base end portion thereof. The pair of grooves 23a, 23a guides both lateral walls of the card 1c, thereby housing the card 1c in the second housing 2.

According to FIG. 1 or 2, the first contact 3 is fixed on a base end portion of the first housing 1. A first end of the first contact 3 can contact a terminal (not shown) of the card 1c and a second end of the first contact 3 is solder-mounted on the first surface 11p of the printed circuit board 1p.

Similarly, according to FIG. 1 or 2, the second contact 4 is fixed on a base end portion of the second housing 2. A first end of the second contact 4 can contact a terminal (not shown) of the card 1c and a second end of the second contact 4 is solder-mounted on the second surface 12p of the printed circuit board 1p.

According to FIG. 2, the first contact 3 and the second contact 4 are identical and can be mounted on both surfaces of the printed circuit board 1p by reversing direction of attachment to the first housing 1 or to the second housing 2.

According to FIG. 1 or 2, the first ejection mechanism 71 uses a leverage linkage mechanism. The first ejection mechanism 71 is provided with a swing lever 711, which is pivotally connected by a fulcrum point C1 in the middle thereof with a flat surface 50 of the first covering plate 5. In addition, the first ejection mechanism 71 is provided with a first ejection button 71a that is adjacent to the first slot 1s.

According to FIG. 1 or 2, by pressing the first ejection button 71a, the swing lever 711 can be pivoted to a first direction by a movement of a link (not shown) slidably connected with one of lateral walls of the first covering plate 5. Thereafter, a bent tooth, which corresponds to a point of action of the swing lever 711, ejects the card 1c.

Similarly, according to FIG. 1 or 2, the second ejection mechanism 72 uses a leverage linkage mechanism. The second ejection mechanism 72 has a swing lever 721 (not shown), which is pivotally connected by a fulcrum point C2 in the middle thereof with a flat surface 60 of the second covering plate 6. In addition, the second ejection mechanism 72 is provided with a second ejection button 72a that is adjacent to the second slot 2s.

According to FIG. 1 or 2, by pressing the second ejection button 72a, the swing lever 721 can be pivoted to a first direction by a movement of a link (not shown) slidably connected with one of lateral walls of the second covering plate 6. Thereafter, a bent tooth, which corresponds to a point of action of the swing lever 721, ejects the card 1c.

In FIG. 1 or 2, the first ejection mechanism 71 attached to the first covering plate 5 is also attached to the second covering plate 6 by reversing a direction of attaching components thereof. In other words, the first ejection mechanism 71 and the second ejection mechanism 72 can be formed from the same group of components.

As shown in FIG. 1 or 2, the first ejection button 71a and the second ejection button 72a can be oriented in the same direction without changing the group of components. It should be noted that the first ejection mechanism 71 and the second ejection mechanism 72 can operate independently from each other.

According to FIG. 1 or 2, both side ends of the first covering plate 5 are flexed to a right angle to form both the lateral walls, on which a cranked hook-shaped opening 57 is formed. On the other hand, the first housing 1 has a cranked hook-shaped projection 17 projecting from both lateral surfaces thereof.

Similarly, according to FIG. 1 or 2, both side ends of the second covering plate 6 are flexed to a right angle to form both the lateral walls, on which a cranked hook-shaped opening 57 is formed. On the other hand, the second housing 2 has a cranked hook-shaped projection 17 projecting from both lateral surfaces thereof.

According to FIG. 3 or FIGS. 4A and 4B, the first housing 1 has a pair of first projections 15 and a pair of second projections 16, projecting from both lateral surfaces thereof, respectively. It should be noted that in FIG. 3 or FIGS. 4A and 4B the first projection 15 and the second projection 16 formed on one lateral face are shown, and illustration of the first projection 15 and the second projection 16 formed on another lateral face is omitted.

According to FIG. 3 or FIGS. 4A and 4B, the first projection 15 has a first tilted surface 15a tilted toward a first direction on a first end portion thereof and a first step 15b facing in a second direction on a second end portion thereof. The second projection 16 has a second step 16b facing in a first direction on a first end portion thereof so as to be behind the first tilted surface 15a (toward the inner side of the second protrusion, that is, on a printed circuit board 1p side). The second projection 16 also has a second tilted surface 16a tilted toward a second direction on a second end portion thereof so as to be in front of the first step 15b (toward the outer side of the second protrusion, that is, on a printed circuit board 1p side).

In addition, according to FIG. 2, the first projection 15 and the second projection 16 are adjacent to each other and integrally formed into a cranked hook-shaped projection 17.

According to FIG. 3 or 4A, the first covering plate 5 has a pair of first openings 55 and a pair of second openings 56 that open to both lateral walls thereof. It should be noted that, in FIG. 3 or FIG. 4A, the first opening 55 and the second opening 56 formed on one lateral wall R are shown, and illustration of the first opening 55 and the second opening 56 formed on another lateral wall L is omitted.

According to FIG. 3 or 4A, the first opening 55 has an engaging side 55b that engages with the first step 15b. In addition, the first opening 55 has a clearance portion 55a that avoids the first tilted surface 15a. The second opening 56 opens so as to avoid the second projection 16 when the engaging side 55b engages with the first step 15b.

According to FIG. 2 or 4A, the first covering plate 5 has a lead terminal 58 on both lateral walls thereof. By inserting the lead terminal 58 into a through-hole it provided on the printed circuit board 1p and solder connecting, the first covering plate 5 can be fixed on the first surface 11p of the printed circuit board 1p.

According to FIGS. 5A and 5B, the second housing 2 have a pair of first projections 15 and a pair of second projections 16, projecting from both lateral surfaces thereof, respectively. It should be noted that, in FIGS. 5A and 5B, the first projection 15 and the second projection 16 formed on one lateral face are shown, and illustration of the first projection 15 and the second projection 16 formed on another lateral face is omitted.

According to FIG. 5A, the first projection 15 has a first tilted surface 15a tilted toward a first direction on a first end portion thereof and a first step 15b facing in a second direction on a second end portion thereof. The second projection 16 is provided with a second step 16b on one end portion thereof so as to be behind the first tilted surface 15a (toward the inner side of the second protrusion, that is, away from a printed circuit board 1p side). The second projection 16 also has a second tilted surface 16a on another end portion thereof so as to be in front of the first step 15b (toward the outer side of the second protrusion, away from a printed circuit board 1p side).

In addition, according to FIG. 2, the first projection 15 and the second projection 16 are adjacent to each other and integrally formed into a cranked hook-shaped projection 17.

According to FIG. 5A, the second covering plate 6 has a pair of first openings 55 and a pair of second openings 56 that open to both lateral walls thereof. It should be noted that, in FIGS. 5A and 5B, the first opening 55 and the second opening 56 formed on one lateral wall R are shown, and illustration of the first opening 55 and the second opening 56 formed on another lateral wall L is omitted.

According to FIG. 5A, the first opening 55 has an engaging side 55b that engages with the first step 16b. In addition, the first opening 55 has a clearance portion 55a that avoids the second tilted surface 16a. The second opening 56 opens so as to avoid the first projection 15 when the engaging side 55b engages with the second step 16b.

According to FIG. 2 or FIGS. 5A and 5B, the second covering plate 6 has a lead terminal 58 on both lateral walls thereof. By inserting the lead terminal 58 into a through-hole it provided on the printed circuit board 1p and solder connecting, the second covering plate 6 can be fixed on a second surface 12p of the printed circuit board 1p.

Next, functionality of the connector 100 according to the first embodiment of the present invention is described.

According to FIGS. 4A and 4B, by moving the first covering plate 5 in a first direction of the first housing 1, an end edge of both lateral walls of the first covering plate 5 is pushed open by the first tilted surface 15a and the second tilted surface 16a. By further moving the first covering plate 5, the pair of engaging sides 55b, 55b can engage with the first step 15b.

In a state shown in FIG. 4B, since the pair of second openings 56, 56 avoids the first projection 15 or the second projection 16, both the lateral walls of the first covering plate 5 can return to an initial state. In other words, the pair of second openings 56, 56 avoids the second projection 16 when the first opening 55 engages with the first step 15b. In a state of being reversed, in a state shown in FIG. 5B, the pair of second openings 56, 56 avoids the first projection 15 when the first opening 55 engages with the second step 16b.

According to FIGS. 5A and 5B, by moving the second covering plate 6 in a first direction of the second housing 2, an end edge of both lateral walls of the second covering plate 6 is pushed open by the first tilted surface 15a and the second tilted surface 16a. By further moving the second covering plate 6, the pair of engaging sides 55b, 55b can engage with the second step 16b.

In a state shown in FIG. 5B, since the pair of second openings 56, 56 avoids the first projection 15 or the second projection 16, both the lateral walls of the second covering plate 6 can return to an initial state. In other words, the pair of second openings 56, 56 avoids the first projection 15 when the first opening 55 engages with the second step 16. In a state of being reversed, in a state shown in FIG. 4B, the pair of second openings 56, 56 avoids the second projection 16 when the first opening 55 engages with the first step 15b.

Comparing FIGS. 4A and 4B with FIGS. 5A and 5B, it can be proved that the first covering plate 5 can be joined to the second housing 2 by reversing in a left-right direction the first covering plate 5. On the other hand, it also can be proved that the second covering plate 6 can be joined to the first housing 1 by reversing in a left-right direction the second covering plate 6.

As described above, in the card connector 100 according to the first embodiment of the present invention, the first and the second housing 1 and 2, and the first and the second covering plates 5 and 6 can be used as common parts, respectively. In other words, in the card connector 100 according to the first embodiment of the present invention, a coupled structure of housing and cover can be constructed such that the housing and the cover are common components.

Next, configuration of a connector according to the second embodiment of the present invention is described. It should be noted that in the following description components designated by the same reference numerals as those already described have the same function, and therefore description thereof may be omitted.

According to FIG. 6, a connector 100 according to the second embodiment includes a first connector 10 and a second connector 20. The first connector 10 has a first slot 1s that is implemented in an end portion of a first surface of a printed circuit board 1p, and into which a card 1c can be inserted. The second connector 20 has a second slot 2s that is implemented in an end portion of a second surface of the printed circuit board 1p, and into which a card 1c can be inserted. The first slot 1s and the second slot 2s are disposed such that the first and the second slots substantially face to each other correspondingly across the printed circuit board 1p.

According to FIGS. 6 to 9, the first connector 10 includes a flat first housing 1, a group of first contacts 3 (see FIG. 2), and a first covering plate 5. The first housing 1 can house the card 1c. The group of first contacts 3 is disposed in a base end portion of the first housing 1 (see FIG. 2) and connected to a terminal (not shown) provided on the card 1c. The first covering plate 5 covers a first surface and both lateral surfaces of the first housing 1.

According to FIGS. 6 to 9, the second connector 20 includes a flat second housing 2, a group of second contacts 4 (see FIG. 2), and a second covering plate 6. The second housing 2 can house the card 1c. The group of second contacts 4 is disposed in a base end portion of the second housing 2 (see FIG. 2) and connected to a terminal (not shown) provided on the card 1c. The second covering plate 6 covers a second surface and both lateral surfaces of the second housing 2.

In FIGS. 6 to 9, the first housing 1 and the second housing 2, the first contact 3 and the second contact 4, and the first covering plate 5 and the second covering plate 6 are formed from the same component or the same group of components.

In FIG. 6, the first connector 10 includes a first ejection mechanism 71. The first ejection mechanism 71 is connected with the first covering plate 5 and can eject the card 1c. In addition, the second connector 20 includes a second ejection mechanism 72 (see FIG. 2). The second ejection mechanism 72 is connected with the first covering plate 6 and can eject the card 1c. Furthermore, the first ejection mechanism 71 and the second ejection mechanism 72 are formed from the same group of components.

According to FIG. 6, both side ends of the first covering plate 5 are flexed to a right angle to form both the lateral walls, on which an H-shaped third opening 59 is formed. On the other hand, the first housing 1 has a pair of H-shaped third projections 19 that project from both lateral surfaces thereof.

Similarly, although not explicitly illustrated in FIG. 6, both side ends of the second covering plate 6 are flexed to a right angle to form both the lateral walls, on which an H-shaped third opening 59 is formed. On the other hand, the second housing 2 has a pair of H-shaped third projections 19 that project from both lateral surfaces thereof.

According to FIG. 7 or 8, the first housing 1 has a pair of H-shaped third projections 19 that project from both lateral surfaces thereof. It should be noted that, in FIG. 7 or 8, the third projection 19 formed on one lateral surface is shown, and illustration of the third projection 19 formed on another lateral surface is omitted.

According to FIG. 7 or 8, the third projection 19 is provided with a pair of third steps 19a and 19b, which are oriented in opposite directions, on a central portion thereof. The third projection 19 is provided with a pair of third tilted surfaces 19c, 19c oriented in a first direction on both sides of the third step 19a so as to be in front of the third step 19a (toward the outer side of the third protrusion).

In addition, according to FIG. 7 or 8, the third projection 19 is provided with a pair of third tilted surfaces 19d, 19d oriented in a second direction on both lateral walls of the third step 19b so as to be in front of the third step 19b (toward the outer side of the third protrusion). The pair of third tilted surfaces 19c, 19c and the pair of third tilted surfaces 19d, 19d are each disposed to be oriented in opposite directions.

According to FIG. 7 or 8, the first covering plate 5 has a pair of H-shaped third openings 59, opening to both lateral walls thereof. It should be noted that, in FIG. 7 or 8, the third opening 59 formed on one lateral wall R is shown, and illustration of the third opening 59 formed on another lateral wall L is omitted.

According to FIG. 7 or 8, the third opening 59 is provided with an engaging tooth 59b in a central portion thereof, that engages with the third step 19b of the third projection 19. In addition, the third opening 59 is provided with a concave portion 59d that avoids the pair of third tilted surfaces 19d, 19d of the third projection 19 on both lateral sides of the engaging tooth 59b.

According to FIGS. 9A and 9B, the second housing 2 has a pair of H-shaped third projections 19 that project from both lateral surfaces thereof. It should be noted that, in FIGS. 9A and 9B, the second projection 19 formed on one lateral face is shown, and illustration of the third projection 19 formed on another lateral face is omitted.

According to FIG. 9A, the third projection 19 is provided with a pair of third steps 19a and 19b, which are oriented in opposite directions, on a central portion thereof. The third projection 19 is provided with a pair of third tilted surfaces 19c and 19c oriented in a first direction on both lateral walls of the third step 19a so as to be more on a printed circuit board 1p side than the third step 19a.

In addition, according to FIG. 9A, the third projection 19 is provided with a pair of third tilted surfaces 19d, 19d oriented in a second direction on both lateral walls of the third step 19b so as to be more away from the printed circuit board 1p than the third step 19b. The pair of third tilted surfaces 19c, 19c and the pair of third tilted surfaces 19d, 19d are each disposed to be oriented in opposite directions.

According to FIGS. 9A and 9B, the second covering plate 6 has a pair of H-shaped third openings 59, opening to both lateral walls thereof. It should be noted that, in FIGS. 9A and 9B, the third opening 59 formed on one lateral wall R is shown, and illustration of the third opening 59 formed on another lateral wall L is omitted.

According to FIG. 9A, the third opening 59 is provided with an engaging tooth 59a in a central portion thereof, that engages with the third step 19a of the third projection 19. In addition, the third opening 59 is provided with a concave portion 59c that avoids the pair of third tilted surfaces 19c, 19c of the third projection 19 on both sides of the engaging tooth 59a.

Next, functionality of the connector 200 according to the second embodiment of the present invention is described.

According to FIGS. 8A and 8B, by moving the first covering plate 5 in a first direction of the first housing 1, an end edge of both lateral walls of the first covering plate 5 is pushed open by a pair of third tilted surfaces 19c, 19c. By further moving the first covering plate 5, the engaging tooth 59b can engage with the third step 19b.

In a state shown in FIG. 8B, since the concave portion 59d provided in the pair of third openings 59 avoids the pair of third tilted surfaces 19d, 19d, both the lateral walls of the first covering plate 5 can return to an initial state. In other words, the pair of third openings 59, 59 avoids the pair of third tilted surfaces 19c, 19c and the pair of third tilted surfaces 19d, 19d when the engaging tooth 59b engages with the third step 19b.

According to FIGS. 9A and 9B, by moving the second covering plate 6 in a first direction of the second housing 2, an end edge of both lateral walls of the second covering plate 6 is pushed open by a pair of third tilted surfaces 19d, 19d. By further moving the second covering plate 6, the engaging tooth 59a can engage with the third step 19a.

In a state shown in FIG. 9B, since the concave portion 59c provided in the pair of third openings 59 avoids the pair of third tilted surfaces 19c, 19c, both the lateral walls of the second covering plate 6 can return to an initial state. In other words, the pair of third openings 59, 59 avoids the pair of third tilted surfaces 19c, 19c and the pair of third tilted surfaces 19d, 19d when the engaging tooth 59a engages with the third step 19a.

Comparing FIGS. 8A and 8B with FIGS. 9A and 9B, it can be proved that the first covering plate 5 can be joined to the second housing 2 by reversing in a left-right direction the first covering plate 5. On the other hand, it also can be proved that the second covering plate 6 can be joined to the first housing 1 by reversing in a left-right direction the second covering plate 6.

As described above, in the card connector 200 according to the second embodiment of the present invention, the first and the second housings 1 and 2 can be integrated with the first and the second covering plates 5 and 6, respectively. In other words, in the card connector 200 according to the second embodiment of the present invention, a coupled structure of housing and cover can be constructed such that the housing and the cover are common components.

The card connector according to the embodiments of the present invention can enable realization of a card connector allowing intergration of components using common components, in a coupled structure of the housing and the cover, by having the shape of a projection (detent) provided on both lateral surfaces of a housing and of an opening (indent) provided on both lateral surfaces of a cover, as a cranked hook shape or an H-shape.

What is claimed is:

1. A card connector comprising:
   a first connector having a first slot that is positioned in an end portion of a first side surface of a printed circuit board, and into which a card can be inserted; and
   a second connector having a second slot that is positioned in an end portion of a second side surface of the printed circuit board, and into which a card can be inserted;
   wherein the first slot and the second slot are disposed such that the first and the second slots face to each other correspondingly across the printed circuit board;
   the first connector includes a flat first housing for housing a card, a plurality of first contacts group that is disposed in a base end portion of the first housing and connected to terminals provided on the first side surface of the card, and a first conductive covering plate that covers a first surface and both lateral faces of the first housing,
   the second connector includes a flat second housing for housing a card, a plurality of second contacts group that is disposed in a base end portion of the second housing and connected to terminals provided on the second side surface of the card, and a second conductive covering plate that covers a second surface and both lateral faces of the second housing,
   the first housing and the second housing, the first contacts group and the second contacts group, and the first covering plate and the second covering plate are formed from the identical group of components,
   the first housing and the second housing include:
   a pair of first hook-shaped projections projecting from both lateral faces thereof, the pair of first projections has a first tilted surface tilted toward a first direction on one end portion thereof and a first step facing in a second direction on another end portion thereof; and
   a pair of second hook-shaped projections projecting from both lateral faces thereof, the pair of second projections has a second step facing in a first direction on one end portion thereof so as to be behind the first tilted surface, and a second tilted surface tilted toward a second direction on another end portion thereof so as to be in front of the first step;
   and the first covering plate and the second covering plate include:
   a pair of first openings opening to both lateral walls thereof, the pair of first openings has an engaging side that engages with the first step or the second step, and a clearance portion that avoids the first tilted surface when the first step engages with the engaging side and avoids the second tilted surface when the second step engages with the engaging side; and
   a pair of second openings opening to both lateral walls thereof, the pair of second openings avoiding the second projection when the first opening engages with the first step and avoids the first projection when the first opening engages with the second step.

2. The card connector according to claim 1, wherein the first projection and the second projection are adjacent to each other and communicate with the first opening and the second opening.

3. The card connector according to claim 1,
   wherein the first connector includes a first ejection mechanism that is connected with the first covering plate and can eject a card,
   the second connector includes a second ejection mechanism that is connected with the second covering plate and can eject a card, and
   the first ejection mechanism and the second ejection mechanism are formed from the same group of components.

4. The card connector according to claim 1,
   wherein the first covering plate and the second covering plate include a plurality of lead terminals, solder-mounted on the printed circuit board, on both lateral walls thereof.

5. A card connector comprising:
   a first connector having a first slot that is positioned in an end portion of a first side surface of a printed circuit board, and into which a card can be inserted; and
   a second connector having a second slot that is positioned in an end portion of a second side surface of the printed circuit board, and into which a card can be inserted;
   wherein the first slot and the second slot are disposed such that the first and the second slots face to each other correspondingly across the printed circuit board;
   the first connector includes a flat first housing for housing a card, a plurality of first contacts group that is disposed in a base end portion of the first housing and connected to terminals provided on the first side surface of the card, and a first conductive covering plate that covers a first side surface and both lateral faces of the first housing,
   the second connector includes a flat second housing for housing a card, a plurality of second contacts group that is disposed in a base end portion of the second housing and connected to terminals provided on the second side surface of the card, and a second conductive covering plate that covers a second face and both lateral surfaces of the second housing,
   the first housing and the second housing, the first contacts group and the second contacts group, and the first covering plate and the second covering plate are formed from the identical group of components;
   the first housing and the second housing include a pair of hook H-shaped third projections projecting from both lateral faces thereof, the pair of H-shaped third projections being provided with a pair of third steps oriented in opposite directions in a central portion thereof, and a pair of third tilted surfaces oriented in opposite directions on both sides of the third steps so as to be in front of the third steps; and
   the first covering plate and the second covering plate include a pair of H-shaped third openings opening to both lateral walls thereof, the pair of H-shaped third openings being provided with an engaging tooth in a central portion thereof that engages with any one of the third steps of the third projections, and a pair of concave portions avoiding the pair of third tilted surfaces of the third projections on both sides of the engaging tooth.

6. The card connector according to claim 5,
wherein the first connector includes a first ejection mechanism that is connected with the first covering plate and can eject a card,
the second connector includes a second ejection mechanism that is connected with the second covering plate and can eject a card, and
the first ejection mechanism and the second ejection mechanism are formed from the same group of components.

7. The card connector according to claim 5,
wherein the first covering plate and the second covering plate include a plurality of lead terminals, solder-mounted on the printed circuit board, on both lateral walls thereof.

* * * * *